United States Patent
Ray et al.

(10) Patent No.: US 6,832,273 B2
(45) Date of Patent: Dec. 14, 2004

(54) SYSTEM AND METHOD TO SPECIFY EXTENDED CONFIGURATION DESCRIPTOR INFORMATION IN USB DEVICES

(75) Inventors: Kenneth D. Ray, Redmond, WA (US); Firdosh K. Bhesania, Kirkland, WA (US); John C. Dunn, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 09/745,404

(22) Filed: Dec. 21, 2000

(65) Prior Publication Data

US 2002/0133694 A1 Sep. 19, 2002

(51) Int. Cl.[7] .................................................. G06F 3/00
(52) U.S. Cl. ............................. 710/42; 710/8; 710/10; 710/16; 710/33; 710/62; 710/65; 710/38
(58) Field of Search ................................. 710/8, 10, 11, 710/16, 33, 62, 65, 38

(56) References Cited

U.S. PATENT DOCUMENTS

| | | | |
|---|---|---|---|
| 5,835,791 A | 11/1998 | Goff et al. | |
| 6,067,628 A | 5/2000 | Krithivas et al. | |
| 6,085,265 A * | 7/2000 | Kou | 710/63 |
| 6,211,870 B1 | 4/2001 | Foster | |
| 6,218,969 B1 * | 4/2001 | Watson et al. | 341/100 |
| 6,219,736 B1 * | 4/2001 | Klingman | 710/315 |
| 6,233,640 B1 | 5/2001 | Luke et al. | |
| 6,249,825 B1 * | 6/2001 | Sartore et al. | 710/8 |
| 6,256,687 B1 | 7/2001 | Ellis et al. | |
| 6,260,084 B1 * | 7/2001 | Wilson et al. | 710/38 |
| 6,268,845 B1 | 7/2001 | Pariza et al. | |
| 6,289,466 B1 | 9/2001 | Bayramoglu et al. | |
| 6,343,260 B1 | 1/2002 | Chew | |
| 6,366,967 B1 * | 4/2002 | Wagner | 710/33 |
| 6,389,495 B1 | 5/2002 | Larky et al. | |
| 6,389,560 B1 * | 5/2002 | Chew | 714/43 |
| 6,394,900 B1 * | 5/2002 | McGlone et al. | 463/20 |
| 6,538,668 B1 | 3/2003 | Ruberg et al. | |
| 6,584,601 B1 | 6/2003 | Kodosky et al. | |
| 6,591,310 B1 * | 7/2003 | Johnson | 710/3 |

FOREIGN PATENT DOCUMENTS

WO    WO 00/59594    10/2000

OTHER PUBLICATIONS

"Universal Serial Bus Common Class Specification" SystemSoft Corporation, Intel Corporation; Dec. 16, 1997; 16 pages.

"USB Device Framework"; Chapter 9 USB Serial Bus Specification Revision 1.1; Sep. 1998; pp. 175–206.

* cited by examiner

*Primary Examiner*—Jeffrey Gaffin
*Assistant Examiner*—Angel L. Casiano
(74) *Attorney, Agent, or Firm*—Lee & Hayes, PLLC

(57) ABSTRACT

The following system and procedure for specifying an extended configuration descriptor includes a USB device that responds to device requests from a host. In response to receiving a host-specific device request that specifies a predetermined index, the USB device returns an extended configuration descriptor to the requester. The extended configuration descriptor includes information that can be used by the requestor to control the USB device. When the USB device is a composite device, the extended configuration descriptor includes function information corresponding to a plurality of sub-devices. Each function comprises one or more interfaces.

36 Claims, 4 Drawing Sheets

SYSTEM AND METHOD TO SPECIFY EXTENDED CONFIGURATION DESCRIPTOR INFORMATION IN USB DEVICES

RELATED APPLICATIONS

This application is related to a prior U.S. patent application Ser. No. 09/498,056, filed Feb. 4, 2000, titled "Host-Specified USB Device Requests", Ser. No. 09/498,056, which is hereby incorporated by reference.

TECHNICAL FIELD

The following description relates generally to the use of peripheral devices with software applications. More specifically, the following description relates to the use of device specific information and resources with such software 1applications.

BACKGROUND OF THE INVENTION

The Universal Serial Bus (USB) is a cable bus that supports data exchange between a host computer and a wide range of simultaneously accessible peripheral devices. The attached peripheral devices share USB bandwidth through a host-scheduled, token-based protocol. The bus allows peripherals to be attached, configured, used, and detached while the host and other peripherals are in operation.

The USB is defined by a specification that is approved by a committee of industry representatives. The specification covers all aspects of USB operation, including electrical, mechanical, and communications characteristics. To be called a USB device, a peripheral must conform to this very exacting specification.

USB device information is typically stored in so-called "descriptors" or request codes—data structures formatted as specified by the USB specification. Descriptors are used in a USB system to define "device requests" from a host to a peripheral device. A device request is a data structure that is conveyed in a "control transfer" from the host to the peripheral device. A control transfer contains the following fields:

bmRequestType—a mask field indicating (a) the direction of data transfer in a subsequent phase of the control transfer; (b) a request type (standard, class, vendor, or reserved); and (c) a recipient (device, interface, endpoint, or other). The primary types of requests specified in the "request type" field are the "standard" and "vendor" types, which will be discussed below.

bRequest—a request code indicating one of a plurality of different commands to which the device is responsive.

wValue—a field that varies according to the request specified by bRequest.

wIndex—a field that varies according to request; typically used to pass an index or offset as part of the specified request.

wLength—number of bytes to transfer if there is a subsequent data stage.

All USB devices are supposed to support and respond to "standard" requests—referred to herein as "USB-specific" requests. In USB-specific requests, the request type portion of the bmRequestType field contains a predefined value indicative of the "standard" request type.

Each different USB-specific request has a pre-assigned USB-specific request code, defined in the USB specification. This is the value used in the bRequest field of the device request, to differentiate between different USB-specific requests. For each USB-specific request code, the USB specification sets forth the meanings of wValue and wIndex, as well as the format of any returned data.

USB devices can optionally support "vendor" requests—referred to herein as "device-specific" requests. In a device-specific request, the request type portion of the bmRequestType field contains a predefined value to indicate a "vendor" request type. In the case of device-specific requests, the USB specification does not assign request codes, define the meanings of wValue and wIndex, or define the format of returned data. Rather, each device has nearly complete control over the meaning, functionality, and data format of device-specific requests. Specifically, the device can define its own requests and assign device-specified request codes to them. This allows devices to implement their own device requests for use by host computers, and provides tremendous flexibility for manufacturers of peripherals.

The inventors have discovered a need for a similar feature that would benefit various hosts, application programs, host operating systems hardware manufacturers (OEMs), and Independent Hardware Vendors (IHVs). Specifically, designers of application programs and operating systems would value the opportunity to define their own device requests (and the associated responses), and to have such requests supported in a uniform way by compatible peripherals. Moreover, OEMs and IHVs would value the ability to supply additional USB device specific information to the hosts, application programs and host operating systems in response to such device requests. However, the different request types supported in the bmRequestType field of a USB device request do not include a "host" type of request.

As an example of this need for a host type of request, consider that the USB Device Working Group (DWG) has defined a set of standards that describe different types of USB devices. For each of these standards, the DWG has created a respective class specification that specifies static predetermined class and subclass numbers that correspond to the class specification. These specifications are designed such that to be in compliance with a particular class specification, an operating system must include only a single default, or "generic" device driver to control a USB device that is configured according to the particular class specification.

When a USB device is installed onto a system, the device indicates that it was created according to a particular DWG class specification by listing predefined class and subclass codes that correspond to the DWG specification. These predefined codes can be used by an operating system to load a single generic device driver to control the device.

However, it is often the case that a vendor of a USB device would prefer that a different, or "more specific" device driver be used to control the device, rather than the generic device driver supplied by the operating system. For example, a more specific device driver may be preferred to work around known bugs in the device's software, provide product identification, use value added features, and the like. Such more specific device drivers are typically supplied by OEM/IHV supplied installation media that are distributed with a device. Such installation media include installation disks (e.g., floppy diskettes) or setup computer program applications.

To provide for more specific device driver matches with respect to a USB device, USB device descriptors include markings that describe the manufacturer, product, and revision. An operating system (OS) can use such markings to determine whether a more specific, and therefore a more customized device driver match is available from the installation media. If for some reason a specific match is not found, the concepts of class and subclass codes, as described above, facilitate the loading of a generic device driver to control the device.

Unfortunately, unless the USB DWG has already allocated certain class and subclass codes for a particular USB device, that particular device cannot have a match based on class and subclass codes to identify a generic device driver to control the device. If the device's corresponding class and subclass codes are not supported by the DWG, an OEM/IHV distributing the device must at least provide installation media with the device to specify a given match that corresponds to a generic driver that is already present on the system. Otherwise, the OEM/IHV must supply a special device driver with the corresponding installation media.

In light of the above, a user of a device that specifies non-standard DWG class codes is required to use such installation media to load a device driver to control the device. It would be beneficial both in terms of simplifying matters for OEMs/IHVs and simplifying customer ease of use if an operating system could specify a default device driver that is already present on the system in response to installing a device that does not specify a standard USB DWG class and/or subclass code.

Ideally, an operating system vendor could develop a new standard USB device class—one not supported by DWG, and distribute a device driver to control devices built to that new standard with the operating system. In this manner, an OEM/IHV could not only distribute devices built to that standard before the USB DWG has adopted a corresponding class and subclass code, but also distribute such devices without needing to supply a special device driver and corresponding installation media. In this way the operating system would natively support the new non-standard USB device by providing a generic device driver to control the new device.

To natively support a non-standard USB device, an operating system would have to request specific information from the new device to identify the new device's non-standard class and subclass codes to determine the particular generic device driver to control the new device. However, in response to device specific requests from an operating system, a USB device (as currently defined by the USB specifications) can only return information related to vendor identification, product identification, and revision information. There is no standard request to allow a vendor to return additional information to an operating system to indicate that the device supports non-standard class and/or subclass codes—those not supported by the USB DWG.

Thus, it would be beneficial if a USB device could indicate through a predefined USB request that it supports such non-standard class and/or subclass codes. This information could be used by an operating system to install default device drivers to control the USB device. However, as discussed above, such a USB request is not defined by the USB specification.

In yet another example that illustrates the need for a host specific USB request, consider that the DWG has established a number of well-defined requests to obtain interfaces that correspond to functions in certain composite devices. A composite device includes a number of logical devices (LDs), wherein each LD is a fully functional sub-device of the composite device. There is typically a one-to-one correspondence between a function and an interface in a composite device, with the exception of certain devices such as USB speaker devices, which implement more than one interface for a single function. In such exceptional cases, because the DWG has a predefined request to return the multiple interfaces that correspond to a function, each interface can be returned in response to a single request.

Otherwise, when the DWG has not defined such a request, a complex procedure must typically be implemented to determine each of the interfaces that correspond to respective functions in a composite device. For example, to determine if a USB device is a composite device, a host must first request the device to indicate how may functions, or LDs that it supports. In response, a composite device will indicates its ability to support multiple functions by first identifying the number of logical devices (LDs) that the device supports. Next, to obtain specific information corresponding to each supported LD, the host must typically issue separate requests, each request being overloaded with a respective LD identification, to obtain each respective LD descriptor. Thus, a typical composite USB device would not return information corresponding to each interface grouping defined in the composite device in response to a single query unless the single query was already predefined by the DWG to return more than one interface in response to a single request.

It would be beneficial to USB composite device makers and to software developers if there was a simple way for a USB device to specify the interfaces that comprise a single function, such that the interfaces could be determined without the needing to implement the complex procedure discussed above. In this manner, newer composite devices not yet supported by the DWG could be treated exactly as the ones currently supported by the DWG.

Accordingly, the invention arose out of concerns associated with providing a host-specific device request that solves the problems described above.

SUMMARY

One embodiment of the described system and procedure specifies non-standard compatible IDs, or non-standard class and subclass codes in a USB device in response to a host-specific device request. A non-standard compatible ID is a class or subclass code that is not supported or defined by the USB DWG. The USB device comprises an extended configuration descriptor in firmware of the USB device. The extended configuration descriptor comprises a set of non-standard class codes that can be used by a host operating system to identify one or more device drivers to control the device. Responsive to receiving a host-specific device request from the operating system, the USB device communicates the extended configuration descriptor to a requestor. Thus, the system and procedure of this implementation simplifies end-user device installation scenarios and allows OEMs/IHVs to implement new USB devices without distributing special device drivers and/or corresponding installation media with each single new USB device.

Moreover, the extended configuration descriptor includes a header section and one or more control function sections. The header section indicates the number of control functions for which mappings exist in the extended configuration descriptor. Each control function section indicates information corresponding to a respective function for the USB device. Each control function comprises one or more interfaces. Because the extended configuration descriptor is communicated to a requestor responsive to the receipt of a single host-specific device request, the inventive concepts of this implementation provide a simple way for a new USB device to specify a group of interfaces that comprise a single function.

DETAILED DESCRIPTION

The following description sets forth a specific embodiment of a system and procedure that incorporates elements recited in the appended claims. The embodiment is described with specificity in order to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Exemplary System

Figure 1:
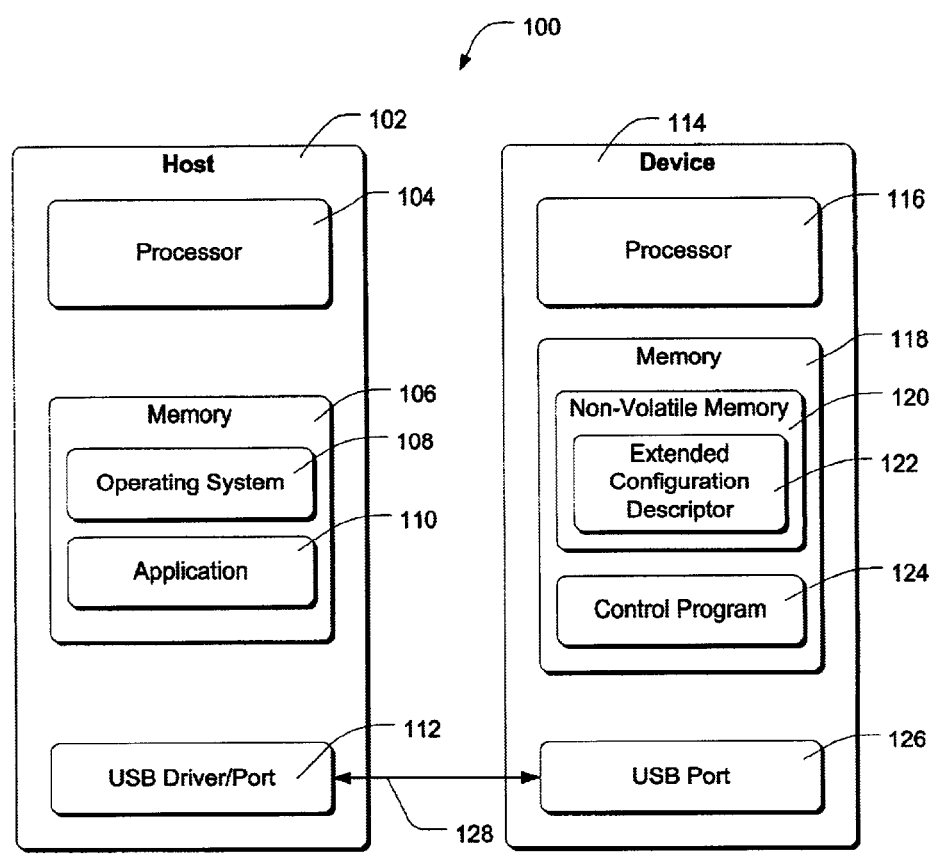
FIG. 1 is a block diagram of an exemplary host/peripheral USB system.

FIG. 1 shows a system 100 wherein a USB device includes non-standard compatible IDs, or non-standard class and subclass codes. Additionally, the system includes a host application program and host operating system that is able to enumerate non-standard compatible IDs, or non-standard class and subclass code corresponding to USB devices. System 100 is compatible with the Universal Serial Bus (USB) specifications. These specifications are available from USB Implementers Forum, which has current administrative headquarters in Portland, Oreg. (current Internet URL: www.usb.org).

System 100 includes a host computer 102 and a USB peripheral device 114. The respective functionality of the computer and peripheral device is embodied in many cases by computer-executable instructions, such as program modules, that are executed by respective processors. Generally, program modules include routines, programs, objects, components, data structures, etc. that perform particular tasks or implement particular abstract data types.

Computer 102 is a conventional desktop PC or other type of computer. Computer 102 has one or more processors 104 and one or more forms of computer-readable memory media 106 such as electronic memory, magnetic storage media, optical storage media, or some other type of data storage. Programs are stored in memory 106 from where they are executed by processor 104. In this example, such programs include an operating system 108 such as the Microsoft "Windows"® family of operating systems. The operating system provides various system services to one or more application programs 110 running on the computer.

The computer also has a USB communications driver and port 112. The USB port is supported by operating system 108. To communicate with a USB device, an application program 110 makes high-level calls to system services provided by the operating system. The system services take care of lower level communications details, and return requested information to the application program.

Peripheral device 114 is one of any number of different types of USB devices such as a data storage device, a digital camera, a scanner, a joystick, game pad, steering unit, mouse, stylus, digital speaker, microphone, display device, and the like. Peripheral device 114 has one or more processors 116 and one or more forms of computer-readable memory media 118, including at least some form of non-volatile memory media 120.

The peripheral device 114 has a USB port 126 and communicates with computer 102 via a USB communications medium 128. The peripheral device also has operating logic 124, which is executed by processor 116 to detect control actuation and for communicating with computer 102 across communication path 128.

The peripheral device 114 responds to requests from the host computer 102 across the communication path 128. These requests are made using control transfers where setup packets (not shown) are exchanged. The USB device returns descriptors in response to exchanging such setup packets. Although the USB Specification defines a number of different standard class and vendor specific descriptors, an extended configuration descriptor 122 is not defined in the USB specification. The extended configuration descriptor allows OEMs/IHVs to store non-standard class and subclass codes—those that are not yet defined by the USB DWG, into non-volatile memory 120 of the device. Moreover, the extended configuration descriptor provides a simple way for a composite USB device to specify a group of interfaces that comprise a single function.

Extended configuration descriptor 122 provides non-standard class codes and subclass codes on a per function basis. (Device vendors can build multiple functions into a device). A function is an independently controlled aspect of a device. A function can be considered to be a group of interfaces conglomerated together that serve a similar purpose. Class codes are also referred to herein as "compatible ids". Subclass codes are also referred to herein as "sub-compatible ids".

Peripheral device 114 supports host-specific device requests to obtain information that is not specified in the USB specification. In this implementation, prior to using the peripheral device, the computer sends a host-specific request to the peripheral device requesting class codes and/or subclass codes that correspond to the peripheral device. In response to the request, the peripheral device provides extended configuration descriptor 122 to the computer. Within the extended configuration descriptor, the computer locates data corresponding to the peripheral device 114, and extracts non-standard class and/or subclass codes, as well as one or more interfaces that correspond to one or more functions. The operating system then loads device drivers based on the extracted extended configuration descriptor to control and interface with the peripheral device.

Exemplary Procedure to Obtain a Device Specific Request Code

Figure 2:
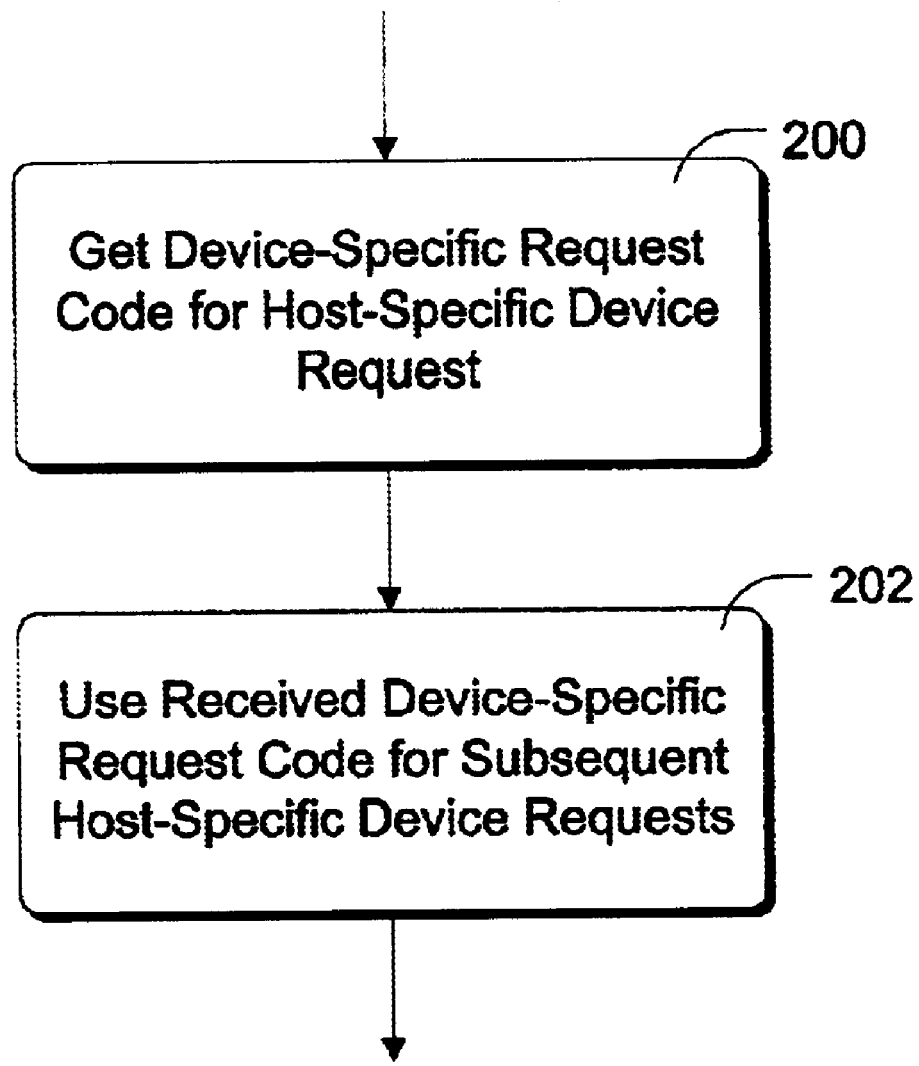
FIG. 2 is a flowchart diagram that shows top-level methodological aspects of an exemplary procedure to obtain and use a device-specific request code for host-specific device requests.

FIG. 2 shows top-level methodological aspects of an exemplary procedure to obtain a device-specific request code for a computer to use when making a host-specific device request. Generally, a new non-standard USB-specific device request is defined for use with various USB peripherals. This request is referred to herein as a host-specific device request. Because of the described methodology, the host-specific device request can be defined by the manufacturer of an operating system or application program, and can then be made available to peripheral vendors so that they can support and respond to the newly defined request. As an example, an OS manufacturer might define a new descriptor allowing peripherals to return device specific data and resources to an operating system in a data format that is determined by the operating system. This would allow the operating system to use a single device request to obtain this information from various different peripherals (assuming those peripherals are configured to support the new device request).

In an initialization phase 200, the host sends a request to the peripheral in the form of a USB-specified device request. The request is for a device-specific request code—of the device's choosing—that will be subsequently used as the request code for the host-specific device request.

Once this request code is obtained, it is used in a subsequent phase 202 to initiate the host-specified device request to obtain the extended configuration descriptor 122 (see FIG. 1). Specifically, the host specifies the request code as he bRequest value in a control transfer (see the "Background" section for details regarding a control transfer). The actual protocol of this device request (meanings of bIndex, bValue, etc.) is as specified in the definition of the host-specific device request. Phase 202 is repeated as desired during subsequent operation, without repetition of the initialization phase 200.

Figure 3:
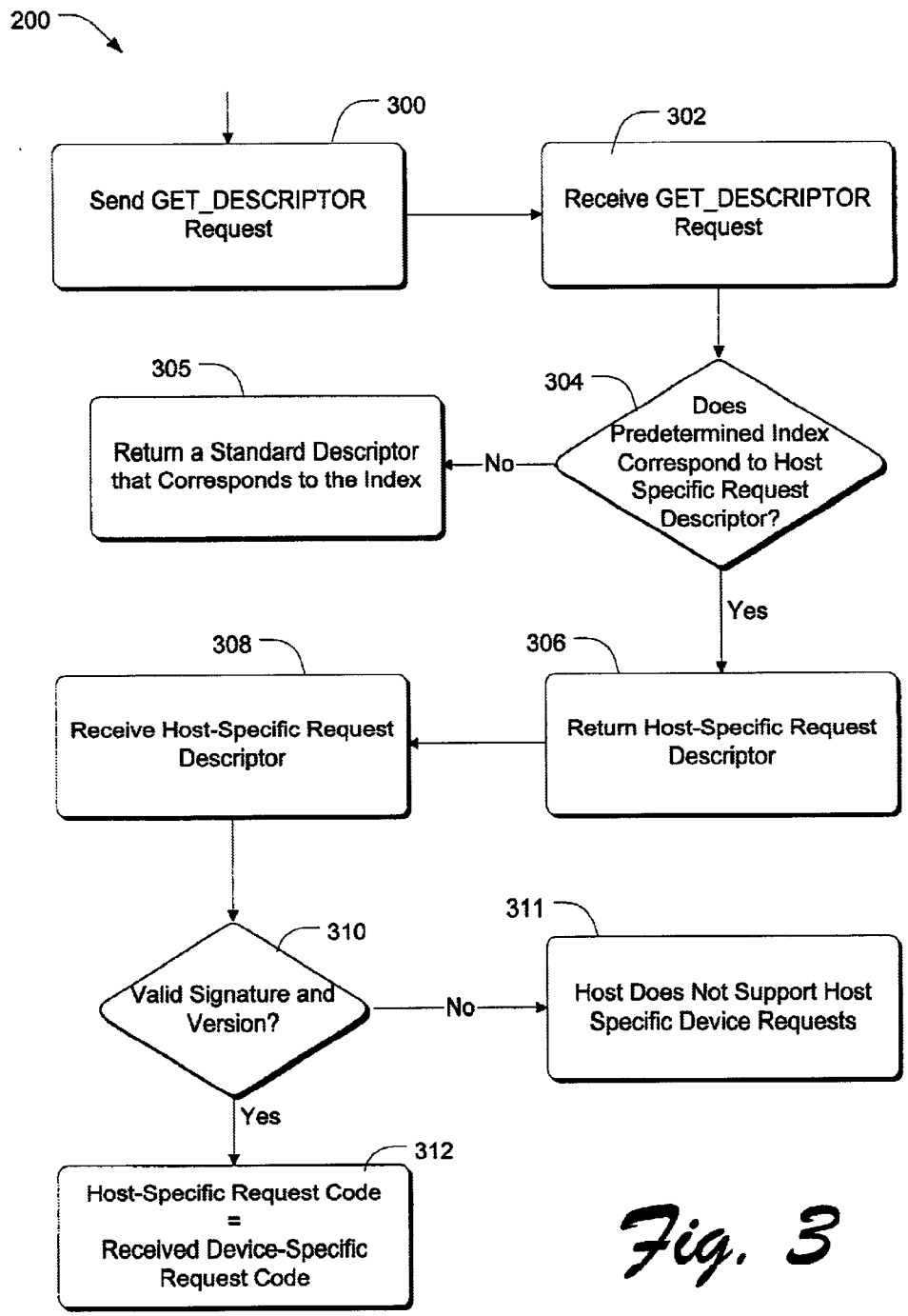
FIG. 3 is a flowchart diagram that shows detailed aspects of an exemplary procedure to obtain a device-specific request code.

FIG. 3 shows more details regarding the initialization phase 200. The host performs an action 300 of sending a GET_DESCRIPTOR device request to the peripheral device. The GET_DESCRIPTOR device request is a standard, USB-specific request, identified in a control transfer by the GET_DESCRIPTOR request code (bRequest= GET_DESCRIPTOR). The fields of the control transfer (discussed above in the background section) have values as follows:

bmRequestType=10000000 (binary), indicating a "device-to-host" transfer, a "standard" or "USB-specific" type request, and a device recipient.

bRequest=GET_DESCRIPTOR. This is a constant (six) defined by the USB specification wValue=03EE (hex). The high byte (03) indicates that the request is for a "string" descriptor, and the low byte is an index value that is predefined as a constant in the definition of the host-specified device request. In this example, it has been defined as EE (hex), but could be predefined as any other value.

wIndex=0.

wLength=12 (hex). This is the length of a host-specific request descriptor that will be returned in response to this request. In the described example, the length is 12 (hex).

data—returned host-specific request descriptor.

A compatible USB device is configured to respond to a request such as this (where wValue=03EE (hex)) by returning a host-specific request descriptor such as the extended configuration descriptor 122 of FIG. 1. This descriptor is not defined by the USB standard, but has fields as defined in the following discussion. The host-specific request descriptor designates a device-specific request code that will work on this device to initiate the host-specific request code. In other words, the manufacturer of the device can select any device-specific request code, and associate it with an implementation of the host-specific device request.

More specifically, the device receives the GET_ DESCRIPTOR device request (block 302) and performs a decision 304 regarding whether the index value (the second byte of wValue) corresponds to the predetermined value (EE (hex)). This predetermined value is a value that is chosen to be used specifically for this purpose.

If the index value does not correspond to the predetermined value, the device responds at 305 in an appropriate way, usually by returning some other descriptor that corresponds to the index value. If the index value does correspond to the predetermined value, an action 306 is performed of returning the host-specific request descriptor to the host.

The host-specific request descriptor includes, for example, the following fields:

bLength—the length of the descriptor (12 (hex) in this example).

bDescriptorType—the type of descriptor (string type in this example).

qwSignature—a signature confirming that this descriptor is indeed a descriptor of the type requested. The signature optionally incorporates a version number. For example, in the described example MSFT100 indicates that this descriptor is for an "MSFT" host-specific device request, version "100" or 1.00.

bVendorCode—the device-specific request code that is to be associated with the host-specified device request.

bPad—a pad field of one byte.

At 308, the host receives the host-specific request descriptor and then performs an action 310 of checking or verifying the signature and version number found in the qwSignature field. The correct signature confirms that the device is configured to support host-specific request codes. If either the signature or version number is incorrect, at 311 the host assumes that the device does not support host-specific request codes, and no further attempts are made to use this feature.

The signature field of the host-specific request descriptor block is what provides backward compatibility. A non-compatible device (one that doesn't support host-specific request codes) might use the predetermined wValue 03EE (hex) to store some other string descriptor, which will be returned to the host without any indication of problems. However, this will become apparent to the host after it examines the data in the location where the signature is supposed to be. If the signature is not found, the host knows that the returned descriptor is not of the type requested, and will assume that the device does not support host-specific request codes.

If the signature and version are confirmed in block 310, at block 312 the host reads the device-specific request code from the bVendorCode field, and uses it in the future as a host-specific request code, to initiate the host-specific device request. When using the device, the host sends the host-specific device request by specifying the obtained device-specific request code as part of a control transfer. The device responds by performing one or more predefined actions or functions that correspond to the host-specific device request, in accordance with the specification of the host-specific device request.

The host-specific device request itself is in the format of a normal USB control transfer, including the fields discussed in the "Background" section above. The bRequest field is set to the value of the bVendorCode field of the host-specific request descriptor, which was earlier obtained from the peripheral device. The bmRequestType field is set to 11000001 (binary), indicating a device-to-host data transfer, a "vendor" or device-specific request type, and a device recipient.

The wValue and wIndex fields are used as defined by the definition of the host-specific device request. The wLength field indicates the number of bytes to transfer if there is a subsequent data transfer phase in the device request.

In a presently preferred implementation of this system, the host-specific device request is used to request one of a plurality of available host-defined string descriptors from the device. The wIndex field of the host-specific device request indicates which of the plurality of strings are to be returned. The device returns the descriptor referred to by wIndex.

The techniques described above allow an operating system designer to specify informational descriptors that devices can implement to provide additional data about themselves—data that is not directly addressed by the USB specification. For example, the techniques described above allow an operating system to specify the extended configuration descriptor 122 of FIG. 1. The operating system uses the extended configuration descriptor to enumerate all USB devices that support non-standard USB DWG class codes and/or subclass codes to determine one or more device drivers to control the devices. The extended configuration descriptor and procedures to use the extended configuration descriptor to enumerate non-standard compatible ids are described in greater detail below in reference to FIG. 4 and Tables 1–2.

Exemplary Data Structures

Figure 4:
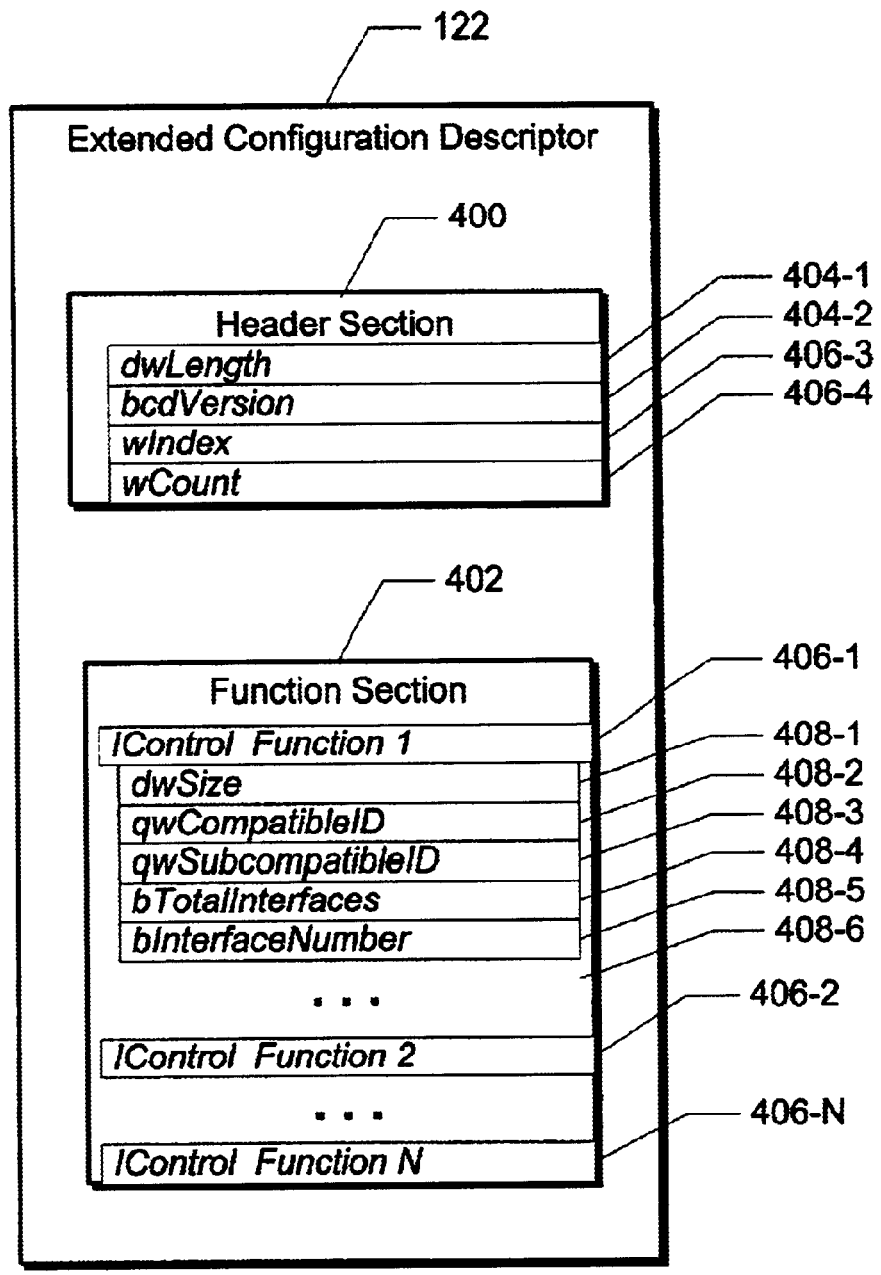
FIG. 4 is a block diagram showing aspects of an exemplary data structure for an extended configuration descriptor.

FIG. 4 shows elements of an exemplary data structure for the extended configuration descriptor 122, which is an example of the host-specific request descriptor described above. The extended configuration descriptor 122 includes a header section 400 and a function section 402. The header section includes a number of elements 404 that describe the function section. The function section includes one or more control functions 406. Each instance of a control function 406 encapsulates information corresponding to a single function for the peripheral device 114.

Header section 400 stores information about the remaining portions of the extended configuration descriptor 122. Header section 400 includes the following fields:

dwLength—the total length of the extended configuration descriptor;

bcdVersion—the version number of the extended configuration descriptor;

wIndex—identifies the extended configuration descriptor; and wCount—the total number of control function sections 406 in the function section 402.

Using this information, the operating system or application program can parse the following function section.

Function section 402 is of variable size because it includes one or more control function sections 406. Each control function section includes information that corresponds to a single function for the peripheral device. The function section includes the following fields:

dwSize—the total length of this control function section;

qwCompatibleID—the compatible ID, or class code for this function;

qwSubCompatibleID—the sub-compatible ID, or subclass code for this function;

bTotalInterfaces—the number of interfaces grouped together to generate this function;

bInteraceNumber—the interface number;

The qwCompatibleID and qwSubCompatibleID values are used to override any USB DWG standard compatible ids and/or sub-compatible ids that may be defined for the device. This means that if USB DWG standard class and/or subclass codes are defined for the USB device, that these standard codes will be ignored in view of the extended configuration descriptor provided compatible and/or sub-compatible ids. The qwCompatibleID and qwSubCompatibleID values should not be confused with the USB DWG defined class and subclass codes-regardless of whether they are used in the extended configuration descriptor.

The bTotalInterfaces field is a value that represents the total number of interfaces that have been grouped together for this particular function. Each individual interface number (bInteraceNumber) forming the function is represented below it.

Example Extended Configuration Descriptor Use

For an operating system to use an extended configuration descriptor stored on a device, the device must first provide information to the operating system that indicates that the device supports host-specific device requests. In this implementation, this is accomplished by storing the string descriptor shown in TABLE 1 at index 0xEE on the USB device. The string descriptor defines an operating system descriptor that is returned to the operating system in response to a USB device request as discussed above. In this implementation, the string descriptor index is 0xEE, however it could be stored at some other location in the USB device.

TABLE 1

Example of an Operating System String Descriptor

```
const byte os_descriptor[ ]={
    0x12,                              //length
    0x03,                              // string descriptor type
    _M_,_S_,_F_,_T_,_1_,_0_,_0_,       //data
    0x01,                              //index
    0x00                               //reserved
};
```

Next, the extended configuration descriptor is stored in a format specified by the operating system on the firmware of the USB device. The extended configuration descriptor is shown below in TABLE 2 In this implementation, the USB device is a device that is compatible with a Remote Network Device Interface Specification (RNDIS) that is not supported by the USB DWG. (This means that the USB DWG has not supplied any compatible ids for RNDIS devices). In this implementation, the device needs to indicate to the operating system that it is compatible with the RNDIS. To accomplish this, the device implements the following extended configuration descriptor.

TABLE 2

Example of an Extended Configuration Descriptor for a RNDIS Compatible USB Device

```
const byte mem_stick_descriptor[ ]={    //header section
    0x00000044,                         // dwLength (DWORD)
    0x01000,                            // bcdVersion
    0x0004,                             // wIndex
    0x0001,                             // wCount
                                        // function section
    0x00000016,                         // wSize
    "RNDIS",                            // qwCompatibleID
    "",                                 // qwSubCompatibleID
    2,                                  // bTotalInterfaces
    1,                                  // First Interface in function 1
    3                                   // Second interface in
                                        //   function = 3
};
```

When the RNDIS compatible device is attached to the USB port on the computer, the operating system retrieves the extended configuration descriptor from the device by using the following API call:

```
GET_DESCRIPTOR(
    bmRequestType = 1100 0001B,    // device-to-host data transfer
    bRequest = 0x01,               // this request
    wValue = 0x0000,               // string descriptor indication
    wIndex = 0x0004);              // this index
```

In response to receiving this request, the USB device returns the extended configuration descriptor to the operating system. Upon receiving the extended configuration descriptor, the operating system determines the non-standard compatible ids based on the extended configuration descriptor. The operating system uses the non-standard compatible ids to load generic (or default) device drivers to control the USB device. This is beneficial because OEMs/IHVs who develop USB devices that are not fully supported by USB DWG standard class and subclass device drivers can specify non-standard class and subclass device drivers to control the USB devices.

Moreover, unless the DWG has a predefined request that returns one or more multiple interfaces that correspond to a function in a composite USB device, a complex procedure must typically be implemented in traditional systems and procedures to determine the interfaces that correspond to the functions. However, the extended configuration descriptor of this implementation includes each interface to function mapping implemented by a composite device. Thus, in contrast to such traditional systems and procedures, this implementation provides a simple way for a new composite USB device to specify a group of interfaces because the extended configuration descriptor is communicated to a requestor in response to receipt of a single host-specific device request.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:
    providing an extended configuration descriptor in firmware of a USB device, the extended configuration descriptor comprising a set of non-standard class codes and control function section indicating information corresponding to a function for the USB devise; and
    responsive to receiving a host-specific device request, communicating the extended configuration descriptor to a requester.

2. A method as recited in claim 1, wherein the set of non-standard class codes includes non-standard subclass codes.

3. A method as recited in claim 1, wherein a non-standard class code comprises a class code or a subclass code that as not defined by the USB DWG.

4. One or more computer-readable media containing a computer executable program for performing a method as recited in claim 1.

5. A method comprising:
    providing an extended configuration descriptor in firmware of a USB device, the extended configuration descriptor comprising a set of non-standard class codes,
    a header section indicating the number of control function sections for which mappings exist in the extended configuration descriptor, and one or more control function sections, each control function section indicating information corresponding to a single function for the USB devise; and
    responsive to receiving a host-specific device request, commmunicating, the extended configuration descriptor to a requestor.

6. A method comprising:
    querying a USB device using a host-specific device request to obtain a descriptor indicating a set of non-standard class codes;
    determining one or more compatible device drivers based on the set of codes indicated by the descriptor; and
    loading the one or more compatible device drivers to control the USB device.

7. A method as recited in claim 6, wherein the querying comprises:
    communicating a standard USB request to the USB device; and
    returning the extended configuration descriptor in response to the standard USB request the extended configuration descriptor corresponding in the USB device to a host specific device request.

8. A method as recited in claim 6, wherein the set of non-standard class codes includes non-standard subclass codes.

9. A method as recited in claim 6, wherein a non-standard class code comprises a class code or a subclass code that is not defined by the USB DWG.

10. A method as recited in claim 6, wherein the extended configuration descriptor comprises a control function section indicating information corresponding to a function for the USB device.

11. A method as recited in claim 6, wherein the extended configuration descriptor comprises
    a header section indicating the number of control functions for which mappings exist in the extended configuration descriptor; and,
    one or more control function sections, each control function section indicating information corresponding to a single function for the USB device.

12. One or more computer-readable media containing a computer executable program that performs a method as recited in claim 6.

13. In a USB device that responds to device requests from a host, the device requests including USB-specific device requests with corresponding USB-specified request codes and device-specific device requests with corresponding device-specified request codes, the USB-specific device requests including a GET_DESCRIPTOR device request with a corresponding GET_DESCRIPTOR request code, a method of implementing a host-specific device request to determine one or more device drivers to control the USB device, the method comprising:
    receiving a GET_DESCRIPTOR device request that specifies a predetermined index;
    responding to the GET_DESCRIPTOR device request by returning an extended configuration descriptor that corresponds in the USB device to the host-specific device request for a device-specific request code, the extended configuration descriptor specifying a non-standard class code that identifies a device driver to control the USB device.

14. A method as recited in claim 13, wherein the extended configuration descriptor comprises a control function section indicating information corresponding to a function for the USB device.

15. A method as recited in claim 13, wherein the extended configuration descriptor comprises device specific information, the device specific information comprising:

a header section indicating the number of control functions for which mappings exist In the extended configuration descriptor; and, one or more control function sections, each control function section indicating information corresponding to a single function for the USB device.

16. One or more computer-readable media containing a media as recited in claim 13.

17. A computer-readable medium containing computer-executable instructions utilized by an application program to interact with a USB control device, the computer-executable instructions comprising:

receiving a request from an application program for a set of non-standard class codes and subclass codas that correspond to the USB control device;

querying the USB control device to obtain an extended configuration descriptor, the extended configuration descriptor corresponding to a host-specific device request that identifies the act of non-standard class codes and subclass codes; and returning the obtained extended configuration descriptor to the requesting application program.

18. A computer-readable storage medium as recited in claim 17, further comprising:

determining, by the requesting application program, one or more default device driven based on the returned extended configuration descriptor; and loading the one or more default device driven to control the control device.

19. A computer-readable storage medium as recited in claim 17, wherein the obtained extended configuration descriptor comprises a control function section indicating information corresponding to a function for the USB device.

20. A computer-readable storage medium as recited in claim 17, wherein the obtained extended configuration descriptor comprises:

a header section indicating the number of control functions for which mappings exist in the extended configuration descriptor; and, one or more control function sections, each control function section indicating information corresponding to a single function for the USB device.

21. A computer comprising one or more computer-readable media as recited in claim 17.

22. One or more computer-readable media containing a computer-executable program for use in conjunction with a USB device that responds to device requests from the program, the device requests including USB-specific device requests with corresponding USB-specified request codes and device-specific device requests with corresponding device-specified request codes, the program comprising:

sending a request to the USB device for mi extended configuration descriptor indicating one or more control functions that correspond to the USB device;

receiving the extended configuration descriptor from the USB device in response to the request, wherein the extended configuration descriptor corresponds in the USB device to a host-specific device request.

23. One or more computer-readable media as recited in claim 22, wherein the extended configuration descriptor comprises a control function section indicating information corresponding to a function for the USB device.

24. One or more computer-readable media as recited in claim 22, wherein the extended configuration descriptor comprises:

a header section indicating the number of control function sections for which mappings exist in the extended configuration descriptor; and, one or more control function sections, each control function section indicating information corresponding to a single function for the USB device.

25. One or more computer-readable media as recited in claim 22, wherein the program further comprises determining one or more compatible device drivers based on the received extended configuration descriptor.

26. A computer comprising one or more computer-readable media as recited in claim 22.

27. A USB device comprising:

a processor;

a port coupled to the processor.

a memory coupled to the processor;

an extended configuration descriptor stored in the memory, the extended configuration descriptor comprising information that identifies a set of non-standard compatible IDs corresponding to the USB device and a control program module stored in the memory, the control program module being configured to send the extended configuration descriptor to a requestor responsive to receiving a host-specific device request at the port.

28. A USB device as recited in claim 27, wherein the USB device further comprises:

a plurality of logical devices, each logical device (LD)) being a sub-device of the USB device;

wherein the extended configuration descriptor further comprises a set of information corresponding to a plurality of interfaces, each LD corresponding to one or more of the interfaces; and wherein the control program module is further configured to communicate the set of information to a requestor responsive to receiving a single request at the port.

29. A USB device as recited in claim 27, wherein the set of non-standard compatible IDs are not supported by the DWG.

30. A USB device as recited in claim 27, wherein the extended configuration descriptor further comprises a control function section indicating information corresponding to a function for the USB device.

31. A USB device as recited in claim 28, wherein the extended configuration descriptor further comprises:

a header section indicating the number of control functions for which mappings exist in the extended configuration descriptor; and, one or more control function sections, each control function section indicating information corresponding to a single function for the USB device.

32. A computer-readable medium having stored thereon a data structure, comprising:

a first data field comprising data indicating a count indicating the number of USB control functions for which mappings exist in a descriptor; and one or more second data fields, the number of second data fields based on the count, each second data field comprising data corresponding to a single function for a USB device.

33. A computer-readable medium as recited in claim 32, wherein the first data field further comprises:

a total descriptor length indication; and a descriptor version indication.

34. A computer-readable medium as recited in claim 32, wherein each second data field further comprises a class code to override a standard USB DWG standard class code.

35. A computer-readable medium as recited in claim 34, wherein the class code is selected from a group of identifications comprising a compatible class code and a sub-compatible class code.

36. A computer-readable medium as recited in claim 32, wherein each second data field further comprises:

a control function length indication;

a total number of interfaces indication, the total number of interfaces being grouped together to generate a control function; and an interface number.

* * * * *